US011004437B2

(12) United States Patent
Hughes et al.

(10) Patent No.: US 11,004,437 B2
(45) Date of Patent: May 11, 2021

(54) ANTI-NOISE SIGNAL GENERATOR

(71) Applicant: Dialog Semiconductor B.V., s-Hertogenbosch (NL)

(72) Inventors: Ashley Hughes, Edinburgh (GB); Wessel Harm Lubberhuizen, Delden (NL)

(73) Assignee: Dialog Semiconductor B.V., 's-Hertogenbosch (NL)

(*) Notice: Subject to any disclaimer, the term of this patent is extended or adjusted under 35 U.S.C. 154(b) by 0 days.

(21) Appl. No.: 16/407,232

(22) Filed: May 9, 2019

(65) Prior Publication Data
US 2020/0357376 A1  Nov. 12, 2020

(51) Int. Cl.
*G10K 11/178* (2006.01)

(52) U.S. Cl.
CPC ............... *G10K 11/17853* (2018.01)

(58) Field of Classification Search
CPC ......... G10K 11/178; G10K 2210/3026; G10K 2210/3027; G10K 2210/506; G10K 2210/3051; G10K 11/17817; G10K 2210/3022; H04R 3/005
USPC ........... 381/71.1–71.2, 71.5–71.6, 71.8, 94.4
See application file for complete search history.

(56) References Cited

U.S. PATENT DOCUMENTS

| | | |
|---|---|---|
| 3,793,513 A | 2/1974 | Kaneko |
| 5,262,972 A | 11/1993 | Holden et al. |
| 5,301,134 A | 4/1994 | Maruyama |
| 5,305,307 A | 4/1994 | Chu |
| 5,757,299 A | 5/1998 | Noro |
| 5,757,862 A | 5/1998 | Ishizu |
| 5,946,650 A | 8/1999 | Wei |
| 7,058,190 B1 | 6/2006 | Zakarauskas |
| 7,636,747 B2 | 12/2009 | Watanabe |
| 7,652,604 B2 | 1/2010 | Parayandeh et al. |
| 7,696,913 B2 | 4/2010 | Melanson |
| 7,756,222 B2 | 7/2010 | Chen |

(Continued)

FOREIGN PATENT DOCUMENTS

| | | |
|---|---|---|
| EP | 2 860 874 | 12/2016 |
| GB | 2541977 | 3/2017 |
| WO | WO 2017/190976 | 11/2017 |

OTHER PUBLICATIONS

D.A. Johns et al., "Sigma-delta based IIR filters," [1991] Proceedings of the 34th Midwest Symposium on Circuits and Systems, Monterey, CA, USA, May 1992, pp. 210-213, vol. 1.

(Continued)

*Primary Examiner* — George C Monikang
(74) *Attorney, Agent, or Firm* — Saile Ackerman LLC; Stephen B. Ackerman

(57) ABSTRACT

An anti-noise signal generator and a method of generating an anti-noise signal are presented. The anti-noise generator includes a first microphone input to receive a first sigma-delta modulated signal at a microphone sampling frequency. The first microphone input is coupled to a combiner via a first path and a second path. The combiner is adapted to combine a first filtered signal from the first path and a second filtered signal from the second path to generate the anti-noise signal. The first path includes a first digital filter adapted to operate at a filter frequency equal or greater than the microphone sampling frequency. The second path includes a second digital filter. The first digital filter may be a sigma-delta based filter that includes a sigma-delta modulator.

22 Claims, 5 Drawing Sheets

(56) References Cited

U.S. PATENT DOCUMENTS

| | | | |
|---|---|---|---|
| 8,467,483 | B2 | 6/2013 | Vishakhadatta |
| 8,644,523 | B2 | 2/2014 | Clemow |
| 8,737,636 | B2 | 5/2014 | Park et al. |
| 8,896,738 | B2 | 11/2014 | Sato et al. |
| 9,053,697 | B2 | 6/2015 | Park et al. |
| 9,065,471 | B1 | 6/2015 | Okuda |
| 9,209,828 | B2 | 12/2015 | Schubert et al. |
| 9,361,872 | B2 | 6/2016 | Park et al. |
| 9,584,146 | B2 | 2/2017 | Op 't Eynde et al. |
| 9,644,561 | B2 | 5/2017 | Magner |
| 9,659,558 | B2 | 5/2017 | Park et al. |
| 9,857,921 | B2 | 1/2018 | Pant |
| 10,236,905 | B1 | 3/2019 | Callanan et al. |
| 2005/0008071 | A1 | 1/2005 | Bose et al. |
| 2005/0053227 | A1 | 3/2005 | Fortier |
| 2007/0188218 | A1 | 8/2007 | Ueda |
| 2007/0273446 | A1 | 11/2007 | Kim |
| 2007/0285160 | A1 | 12/2007 | Kim |
| 2008/0225168 | A1 | 9/2008 | Ouslis |
| 2010/0318205 | A1 | 12/2010 | Ohkuri |
| 2011/0007907 | A1 | 1/2011 | Park et al. |
| 2012/0148074 | A1 | 6/2012 | Bastiaens |
| 2014/0112492 | A1 | 4/2014 | Clemow |
| 2014/0125504 | A1 | 5/2014 | Braswell |
| 2014/0333462 | A1 | 11/2014 | Breems |
| 2016/0173112 | A1 | 6/2016 | Das |

OTHER PUBLICATIONS

D. A. Johns et al., "Design and analysis of delta-sigma based IIR filters," IEEE Transactions on Circuits and Systems II: Analog and Digital Signal, Processing, vol. 40, Issue: 4, Apr. 1993, pp. 233-240.

D. A. Johns et al., "IIR filtering on sigma-delta modulated signals," Electronics Letters, Feb. 14, 1991, vol. 27, No. 4, pp. 307-308.

D. A. Johns, "Analog and Digital State-Space Adaptive IIR Filters", PhD Thesis, Mar. 1989, 153 pages.

D. A. Johns et al., "Adaptive Recursive State-Space Filters Using a Gradient-Based Algorithm," IEEE Transactions on Circuits and Systems, vol. 37, Issue: 6, Jun. 1990, pp. 673-684.

P. W. Wong et al., "FIR Filters with Sigma-Delta Modulation Encoding," Transactions on Acoustics, Speech, and Signal Processing, vol. 38, Issue: 6, Jun. 1990, pp. 979-990.

Horst Gether et al., A perspective on digital ANC solutions in a low latency dominated world, EDN, Jun. 19, 2017, https://www.edn.com/design/analog/4458544/A-perspective-on-digital-ANC-solutions-in-a-low-latency-dominated-world.

M. A. Aldajani et al., "Stability analysis of an adaptive structure for sigma delta modulation," ICECS 2000. 7th IEEE International Conference on Electronics, Circuits and Systems (Cat. No. 00EX445), Dec. 2000, pp. 129-132, vol. 1.

M. A. Aldajani et al., "Stability and Performance Analysis of an Adaptive Sigma-Delta Modulator," IEEE Transactions on Circuits and Systems II: Analog and Digital Signal Processing, vol. 48, No. 3, Mar. 2001, pp. 233-244.

Robert Bristow-Johnson, DSP Trick: Fixed-Point DC Blocking Filter With Noise-Shaping, dspGuru by Iowegian International, Apr. 17, 2011, https://dspguru.com/dsp/tricks/fixed-point-dc-blocking-filter-with-noise-shaping/, accessed on Apr. 18, 2019, 2 pages.

Richard G. Lyons, DSP Tricks: DC Removal, Embedded, Aug. 11, 2008, https://www.embedded.com/design/configurable-systems/4007653/DSP-Tricks-DC-Removal, accessed on Apr. 18, 2019, pp. 1-5.

Richard G. Lyons, Understanding digital signal processing, Second Edition, Prentice Hall PTR, 2004, chapter 13, pp. 84-87.

Ali Grami, Introduction to Digital Communications, Elsevier, 2016, chapter 5, pp. 217-264.

A query on the non-uniform Quantization, Stack Exchange, 2017, https://dsp.stackexchange.com/questions/40137/a-query-on-the-non-uniform-quantization, accessed on Apr. 18, 2019.

Jon Dattorro, The Implementation of Recursive Digital Filters for High-Fidelity Audio, Journal of Audio Engineering Society, Nov. 1988, vol. 36, No. 11, pp. 851-878 and Letters to the Editor.

Thomas Kite, Understanding PDM Digital Audio, Audio Precision Inc., 2012, http://users.ece.utexas.edu/~bevans/courses/rtdsp/lectures/10 Data Conversion/APUnderstanding PDM Digital Audio.pdr, accessed on Apr. 18, 2019, pp. 1-9.

Xilinx, CIC, Aug. 2007, https://www.mit.bme.hu/systems/files/oktatas/targyak/8498/CIC_ppt.pdf, accessed in Apr. 18, 2019, 45 pages.

Alan V. Oppenheim et al., "Discrete-Time Signal Processing", 2010 Pearson, p. 412.

Notice of Allowance, U.S. Appl. No. 16/407,227, dated Apr. 20, 2020, First Named Inventor: Ashley Hughes, 10 pages.

U.S. Notice of Allowance, U.S. Appl. No. 16/407,227, filed May 9, 2019, Applicant: Hughes et al., dated Jan. 21, 2020, 13 pages.

U.S. Notice of Allowance, U.S. Appl. No. 16/407,242, filed May 9, 2019, Applicant: Hughes et al., dated Jan. 8, 2020, 12 pages.

U.S. Notice of Allowance, U.S. Appl. No. 16/407,247, filed May 9, 2019, Applicant: Hughes et al., dated Jan. 17, 2020, 12 pages.

U.S. Office Action, U.S. Appl. No. 16/407,250, filed May 9, 2019, Applicant: Hughes et al., dated Feb. 4, 2020, 14 pages.

U.S. Notice of Allowance, U.S. Appl. No. 16/407,227, First Named Inventor: Ashley Hughes, dated Jun. 5, 2020, 11 pages.

U.S. Notice of Allowance, U.S. Appl. No. 16/407,250, First Named Inventor: Ashley Hughes, dated Jun. 2, 2020, 9 pages.

U.S. Notice of Allowance, U.S. Appl. No. 16/407,247, First Named Inventor: Ashley Hughes, dated Jun. 15, 2020, 9 pages.

U.S. Notice of Allowance, U.S. Appl. No. 16/407,242, First Named Inventor: Ashley Hughes, dated Jun. 2, 2020, 7 pages.

U.S. NOA, U.S. Appl. No. 16/854,341, First Named Inventor: Ashley Hughes, dated Nov. 9, 2020, 19 pages.

ANTI-NOISE SIGNAL GENERATOR

RELATED PATENT APPLICATIONS

This application is related to application Ser. No. 16/407,250, filed on May 9, 2019, application Ser. No. 16/407,247, filed on May 9, 2019, application Ser. No. 16/407,242, filed on May 9, 2019, application Ser. No. 16/407,254, filed on May 9, 2019 and application Ser. No. 16/407,227, filed on May 9, 2019, all of which are assigned to a common assignee, and all of which are incorporated by reference in their entirety.

TECHNICAL FIELD

The present disclosure relates to a system and method for generating an anti-noise signal. In particular, the present disclosure relates to a tuneable anti-noise signal generator having low latency.

BACKGROUND

Audio devices such as headsets or earpieces may be equipped with various noise cancellation techniques providing the user with an improved audio experience. Such audio devices include a loudspeaker and one or more microphones to perform active noise cancellation (ANC). The microphones are used to monitor environmental noise which is then used to generate an appropriate anti-noise signal to suppress the environmental noise experienced by the user when played through the speaker.

Conventional ANC systems may be implemented either as digital or analogue devices. The analogue systems have low latency but are difficult to tune. In contrast, digital systems based on digital filters are more easily tuneable, however they are restricted by a higher latency as they perform discrete-time sampling of microphone signals. Increased system latency introduces a phase shift which varies with frequency. The phase of the anti-noise signal determines whether noise is attenuated or amplified when the noise signal is superimposed onto the anti-noise signal, as a result it plays a key role in the cancellation performance of the ANC. The minimum system latency of digital ANC systems is determined by the sampling rate of the system. Current digital ANC systems attempt to minimise this latency by operating on samples at high sampling frequencies. However, these systems process samples passed through a Sample Rate Converter (SRC), which has its own associated latency.

SUMMARY

It is an object of the disclosure to address one or more of the above-mentioned limitations. According to a first aspect of the disclosure, there is provided an anti-noise signal generator comprising a first microphone input adapted to receive a first sigma-delta modulated signal at a microphone sampling frequency; and a combiner coupled to the first microphone input via a first path and a second path, the combiner being adapted to combine a first filtered signal from the first path and a second filtered signal from the second path to generate the anti-noise signal; wherein the first path comprises a first digital filter coupled to the first microphone input; the first digital filter being adapted to operate at a filter frequency equal or greater than the microphone sampling frequency; and wherein the second path comprises a second digital filter.

Optionally, the first digital filter may be a sigma-delta based filter comprising a sigma-delta modulator. For instance the first digital filter may comprise a Quasi-Orthonormal System filter.

Optionally, the first sigma-delta modulated signal is encoded using more than two quantization levels. For example, the first microphone input may be coupled to a sigma-delta modulator analog-to-digital converter adapted to convert the sigma-delta modulated signal with two or more quantization levels.

Optionally, the second path comprises a decimator and an interpolator coupled to the second digital filter.

Optionally, the anti-noise signal comprises a second microphone input adapted to receive a second sigma-delta modulated signal at the microphone sampling frequency from a second microphone, each microphone input being coupled to the combiner via the first path and the second path.

For example, the first microphone may be a feedforward microphone and the second microphone may be a feedback microphone.

Optionally, the second sigma-delta modulated signal is encoded using more than two quantization levels. For example, the second microphone input may be coupled to a sigma-delta modulator analog-to-digital converter adapted to convert the sigma-delta modulated signal with two or more quantization levels.

Optionally, the decimator is adapted to down sample the first and second sigma delta modulated signals to provide a third signal and a fourth signal; the second digital filter being adapted to filter the third and fourth signals to provide the second filtered signal.

Optionally, the interpolator is adapted to interpolate the second filtered signal.

Optionally, the first filter is configured to implement a first transfer function to filter the first sigma-delta modulated signal and a second transfer function to filter the second sigma-delta modulated signal.

Optionally, the first filter comprises an adder for combining the filtered signals.

Optionally, the first filter comprises a first gain associated with the first transfer function and a second gain associated with the second transfer function.

Optionally, the second digital filter is configured to implement a third transfer function to filter the first sigma-delta modulated signal and a fourth transfer function to filter the second sigma-delta modulated signal and an adder for combining the filtered signals.

Optionally, the second digital filter comprises a third gain associated with the third transfer function and a fourth gain associated with the fourth transfer function.

Optionally, the anti-noise signal generator comprises a gain controller adapted to adjust at least one of the first, second, third and fourth gains.

Optionally, the gain controller may be provided on the second path.

Optionally, at least one of the first path and the second path is implemented using a digital signal processor configured to execute a filtering algorithm. For instance, the second path may be implemented using a digital signal processor.

Optionally, the combiner operates at a frequency equal or greater than the filter frequency of the first filter.

Optionally, the first path comprises at least one of an up-sampler and a high pass filter. For instance the up-sampler may be provided before the high pass filter.

According to a second aspect of the disclosure there is provided an audio device comprising a first microphone adapted to provide a first sigma-delta modulated signal at a microphone sampling frequency; an anti-noise signal generator for generating an anti-noise signal and a speaker for converting the anti-noise signal into a wave; the anti-noise signal generator comprising a first microphone input adapted to receive the first sigma-delta modulated signal from the first microphone; and a combiner coupled to the first microphone input via a first path and a second path, the combiner being adapted to combine a first filtered signal from the first path and a second filtered signals from the second path to generate the anti-noise signal; wherein the first path comprises a first digital filter coupled to the first microphone input; the first digital filter being adapted to operate at a filter frequency equal or greater than the microphone sampling frequency and wherein the second path comprises a second digital filter.

Optionally, the audio device comprises a second microphone adapted to provide a second sigma-delta modulated signal at the microphone sampling frequency; and a second microphone input adapted to receive the second sigma-delta modulated signal from the second microphone, wherein each microphone input is coupled to the combiner via the first path and the second path. For example, the first microphone may be a feedforward microphone and the second microphone may be a feedback microphone.

The audio device according to the second aspect of the disclosure may comprise any of the features described above in relation to the anti-noise signal generator according to the first aspect of the disclosure.

According to a third aspect of the disclosure there is provided a method of generating an anti-noise signal, the method comprising converting a sound into a first sigma-delta modulated signal at a sampling frequency; filtering the first sigma-delta modulated signal along a first path to provide a first filtered signal; wherein the first path comprises a first digital filter adapted to operate at a filter frequency equal or greater than the sampling frequency; filtering the first sigma-delta modulated signal along a second path to provide a second filtered signal; wherein the second path comprises a second digital filter; combining the first filtered signal from the first path and a second filtered signals from the second path to generate the anti-noise signal.

Optionally, the first sigma-delta modulated signal is encoded using more than two quantization levels.

Optionally, the first filter comprises a sigma-delta filter.

The method of the third aspect of the disclosure may share any of the features of the first and second aspects, as noted above and herein.

BRIEF DESCRIPTION OF THE DRAWINGS

The disclosure is described in further detail below by way of example and with reference to the accompanying drawings, in which.

DESCRIPTION

Figure 1:
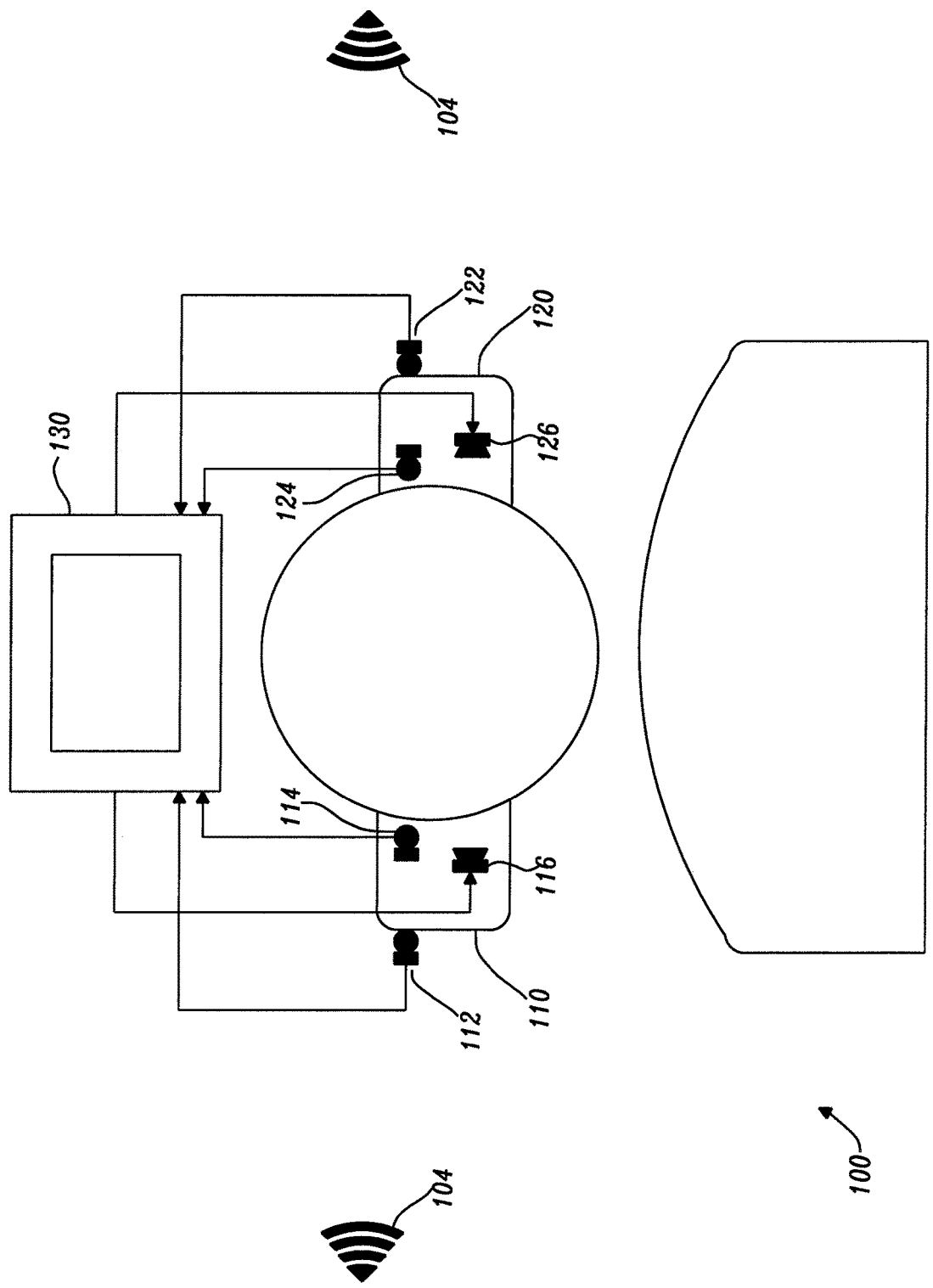
FIG. 1 is a diagram of an audio device provided with an ANC system.

FIG. 1 is a schematic of an audio device or system provided with active noise cancellation ANC. The system 100 comprises a left headphone cup 110, a right headphone cup 120 and a processing unit 130 for performing ANC. The left headphone cup includes, a left feedback microphone 114 and a left speaker 116. In addition a feedforward microphone 112 is placed externally to the left headphone cup 110. Similarly the right headphone cup includes, a right feedback microphone 124 and a right speaker 126. A right feedforward microphone 122 is placed externally to the right headphone cup 120. The processing unit 130 is coupled to the four microphones and to the two speakers to implement a so-called active noise cancellation system (ANC). The active noise cancellation system aims at reducing the environmental noise 104 experienced by user of the audio system by generated an anti-noise signal. It will be appreciated that the processing unit 130 may be integrated as part of the headphone cups 110 or 120 or both.

In operation, the feedforward microphone 112 detects the environmental noise signal 104. The output of the microphones 112 is sent to the processing unit 130 to be inverted. The processing unit 130 then generates a feedforward anti-noise signal provided via the speaker 116. The feedback microphone 114 detects an audio signal inside the headphones cup 110, at the user's ears. The output of the microphone 114 is sent to the processing unit 130 and compared with the environment signal detected by the microphone 112 and the difference is used to create a feedback anti-noise signal. The anti-noise signal is a combination of the feedback and feedforward anti-noise signals. When mixed with the environment signal, the anti-noise signal achieves noise cancellation. Such an operation is mirrored by the microphones 122 and 124 and speaker 126 on the right side of the audio system.

The environment signal detected by the feedforward microphones 112 and 122 and the noise signal detected by the feedback microphones 114 and 124 are different as they travel along different acoustic paths. As a result complex signal processing of the anti-noise signal(s) is necessary in order to achieve optimal noise suppression at the user's ears. For example, the ANC might have to account for attenuation and phase shift experienced by the environmental noise signal when travelling through the headphone cups and/or for noise introduced in the anti-noise signal by the electrical components of the processing unit itself, such as quantization noise.

The microphone 112, 114, 122 and 124 may be analog or digital microphones. Digital microphones may provide a sigma-delta modulated signal SDM such as a pulse density modulated signal PDM. In standard digital systems operating with digital microphones, filtering of the microphones' output signal requires to first convert the signal into pulse code modulation (PCM), then filter and finally convert back to pulse density modulation (PDM). However, this approach generally increases the latency of the system because decimation, filtering and interpolation must be performed in order to pass from PDM to PCM.

Figure 2:
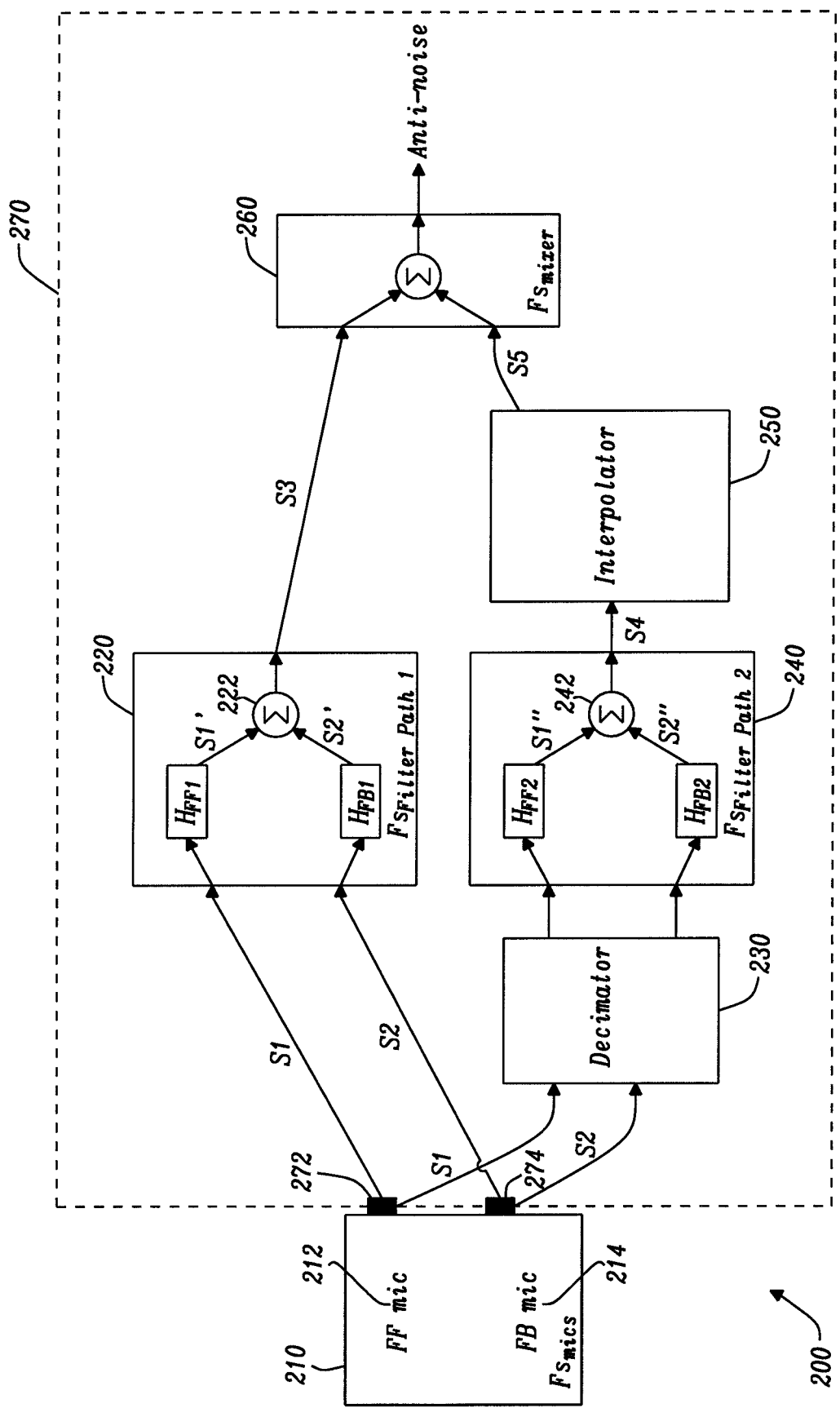
FIG. 2 is a diagram of an anti-noise signal generator system.

FIG. 2 is a diagram of an anti-noise generator system 200 according to the disclosure. The anti-noise generator system 200 includes a set of microphones 210 coupled to an anti-noise generator 270. The set of microphones 210 includes a feedforward microphone 212 and a feedback microphone 214. The set of microphones 210 is coupled to a combiner or adder 260 via a first filtering path and a second filtering path respectively. The first filtering path, also referred to as fast path is formed by a first filter 220. The second filtering path, also referred to as slow path includes a decimator 230, a second filter 240 and an interpolator 250. The components 220, 230, 240, 250 and 260 form the anti-noise generator 270 also referred to as ANC block. The ANC block has a first input 272 for receiving a signal from the first microphone 212 and a second input 274 for receiving a signal from the second microphone 214. In this embodiment the microphones 212 and 214 are digital microphones. However it will be appreciated that they could be replaced by analog microphones coupled by a digital to analog converter. The microphones 212 and 214 may each include a sigma-delta modulator ADC to provide a first sigma-delta modulated signal and a second sigma-delta modulated signal. Alternatively, a sigma-delta modulator can be used as part of an ADC provided with the ANC block. The ANC block 270 may be implemented on an integrated circuit or chip.

Both PDM modulation and SDM modulation encode signal information using a density of pulses. However, in PDM the pulses are provided between only two quantization levels for instance 0 and 1, whereas in SDM the pulses may be provided between more than two quantization levels, for instance 3 or 4 levels or more. Therefore PDM may be viewed as a variety of SDM which only uses two quantization levels.

Due to the greater number of quantization levels associated with SDM signals, the use of SDM signals in the system of the disclosure allows a better signal to noise ratio SNR to be achieved. It also improves the flexibility of the system. For instance using an ANC block configured to receive SDM signals with a known number of quantization levels permit the system to be used with analogue microphones as well as digital ones. The use of SDM signals may also reduce the area of the ADC.

In operation, the feedforward microphone 212 converts a first environmental sound into a first sigma-delta modulated signal S1 and the feedback microphone 214 converts a second environmental sound into a second sigma-delta modulated signal S2. Both microphones operate at a microphone sample frequency $F_{Smics}$. The signals S1 and S2 may be sigma-delta modulated signals SDM.

The first filter 220 is a low-latency digital filter such as a sigma-delta based digital filter adapted to filter the sigma-delta modulated signals S1 and S2 directly, that is without any pre-processing stage. For instance, the first filter 220 may be a Quasi-Orthonormal System (QOS) filter, or any other filter adapted to operate directly on sigma-delta modulated signals without the need for down-sampling or low-pass filtering; that is without the need to convert to Pulse-Coded Modulation (PCM) before the filtering operation. An example of a suitable QOS filter is described in D. A. Johns and D. M. Lewis, "IIR filtering on sigma-delta modulated signals," in *Electronics Letters*, vol. 27, no. 4, pp. 307-308, 14 Feb. 1991. The first filter 220 being connected directly to microphone signals and operating with a high sampling rate reduces the system latency. This reduction in latency is greater compared with system which simply increase the filter sampling frequency alone.

The filter 220 is configured to implement a first transfer function $H_{FF1}$ for filtering S1 and a second transfer function for filtering S2. The filter 220 may comprises a sigma-delta modulator not shown and operates at a filter frequency $F_{Sfilter\_path1}$ that is equal or greater than the microphone sampling frequency $F_{Smics}$. The first filter 220 filters S1 and S2 and add the filtered signals S1' and S2' using adder 222 to provide a signal S3.

On the second path, the decimator 230 down samples the signals S1 and S2 which are then received by the second filter 240. The second filter 240 is a digital filter adapted to filter the down sampled signals S1 and S2. The filter 240 is configured to implement a first transfer function $H_{FF2}$ for filtering S1 and a second transfer function $H_{FB2}$ for filtering S2. The filter 240 operates at a filter frequency $F_{Sfilter\_path2}$ that is slower than the microphone sampling frequency $F_{Smics}$. The second filter 240 filters S1 and S2 and add the filtered signals S1" and S2" using adder 242 to provide a signal S4. The signal S4 is interpolated by interpolator 250 hence producing interpolated signal S5. The combiner 260 then combines the signals S3 and S5 with a sampling frequency $F_{Smixer}$ to generate the anti-noise signal. The combiner 260 also referred to as adder, may be clocked at the sampling frequency of the first path $F_{Sfilter\_path1}$ or the sampling frequency of the second path $F_{Sfilter\_path2}$. However, to preserve the benefit of using the low-latency filtering path, the combiner 260 should be clocked with the sampling frequency of the first path $F_{Sfilter\_path1}$.

The system of FIG. 2 does not require down-sampling on the first path, so there is no need for a Sample Rate Converter SRC block having its own associated latency. This system provides a versatile ANC system characterised by a low latency and ease of tuneability. The use of two parallel filtering paths allows the system to combine a low latency ANC filter (first filter) with a more flexible albeit higher latency ANC filter (second filter). Since the second filter operates at a relatively low sampling rate on PCM data it can be implemented using existing techniques. For instance, the second filter may be implemented as a hardware or a software biquad filter. When using a software implementation, the order of the filter is easily changed as required. This allows a compromise to be made between filter order, implementation area on silicon, and flexibility of tuning for the system.

The first filtering path may be provided with additional components. For instance an up-sampler may be provided to increase the oversampling ratio (OSR) of the input signal. This may be used to improve the signal to noise ratio of the first digital filter 220.

A DC blocker such as a high pass filter may be added to remove any DC bias potentially present in the microphone signals. This permits to increase the usable dynamic range of the subsequent filtering block. The DC blocker may operate at a frequency equal or greater than the microphone sampling frequency.

In addition a low pass filter may also be provided to filter the anti-noise signal hence reducing the level of out-of-band modulation noise. Such a low pass filter may operate at a frequency equal or greater than the microphone sampling frequency.

Figure 3:
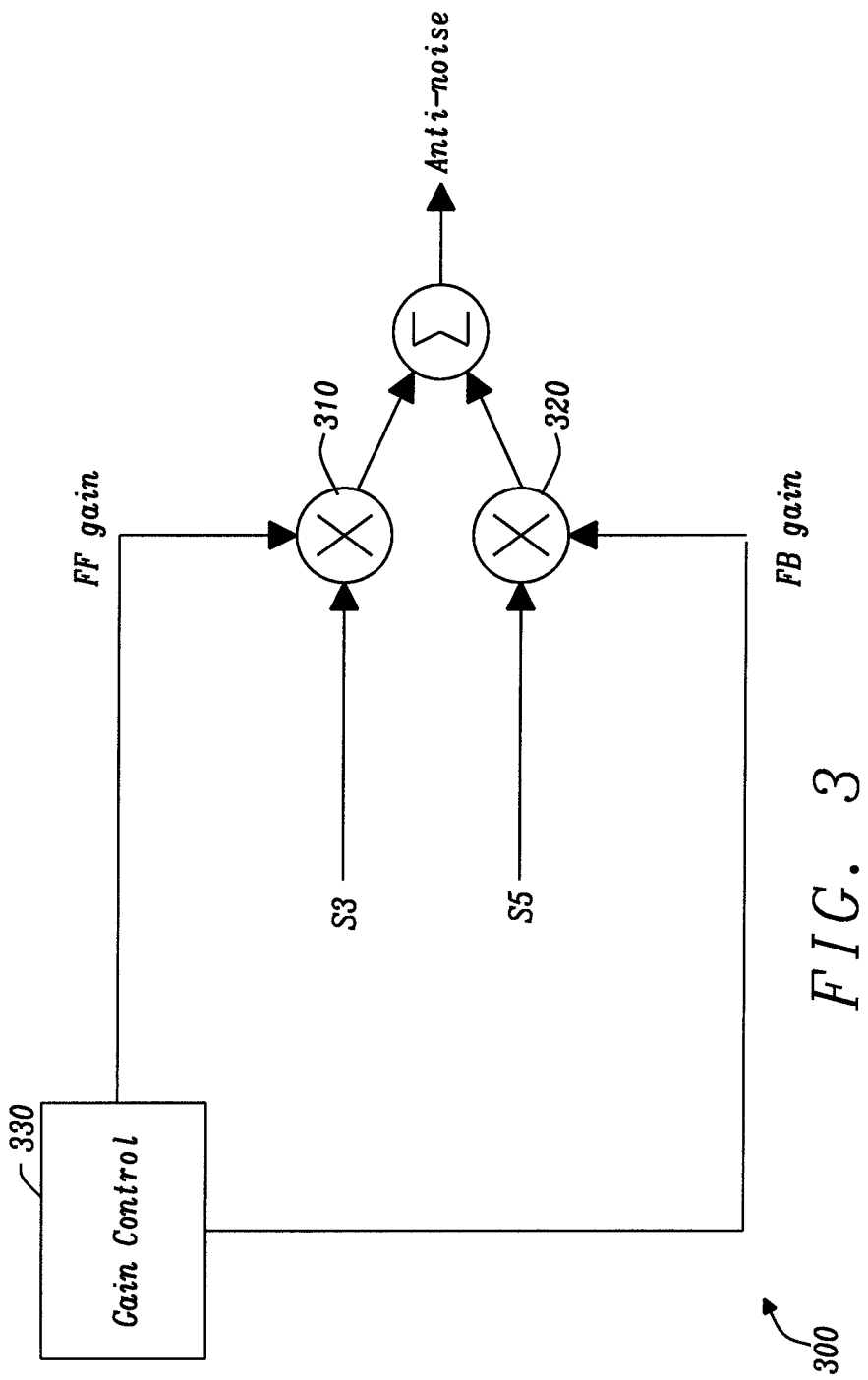
FIG. 3 is a diagram of a combiner provided with a gain controller.

FIG. 3 illustrates a combiner 300 with adjustable gain allowing each signal received by the combiner to be added in variable proportions. The weights 310 and 320 applied to the signals S3 and S5 respectively may be updated by a gain controller 330. This allows gains to be ramped up and down to and from zero, fading the output signal in and out smoothly to avoid popping and clicking on the audio output. The gain controller 330 permits to control the weights 310 and 320 dynamically, allowing features such as calibration gains and limiter functionality to be applied to the input signals. The combiner 300 may operate at a frequency equal or greater than microphone sampling frequency.

Figure 4:
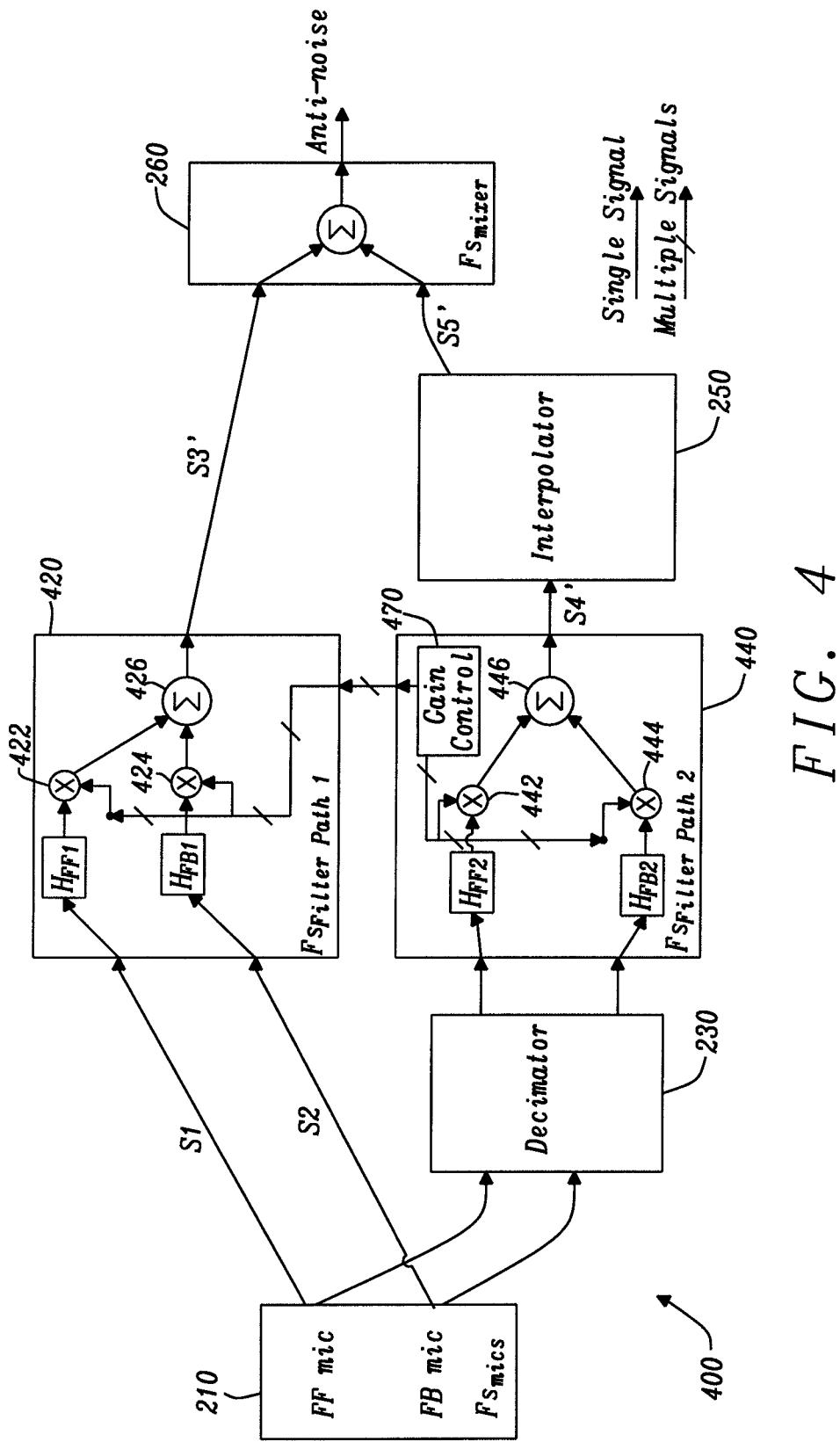
FIG. 4 is a diagram of another anti-noise signal generator system.

FIG. 4 shows a diagram of an anti-noise signal generator provided with filters allowing user-gain calibration and fade-in or fade-out functionalities to be implemented. The system 400 is similar to the anti-noise generator system 200 described with reference to FIG. 2, in which certain parts of the circuit have been added or modified. The same reference numerals have been used to represent corresponding components and their description will not be repeated for sake of brevity. In this implementation, the first path is provided with a first filter 420 and the second path is provided by a second filter 440.

The first filter 420 is configured to multiply the first filtered signal with a first channel gain 422 and the second filtered signal with a second channel gain 424. The adder 426 sums the filtered weighted signals to provide the output signal S3'. Similarly, the second filter 440 is configured to multiply the first filtered signal with a first channel gain 442 and the second filtered signal with a second channel gain 444. The adder 446 sums the filtered weighted signals to provide the output signal S4'. A gain controller 470 is provided to control the channel gains 422, 424 of the first filter 420 as well as the channel gains 442 and 444 of the second filter 440. This allows the relative contributions of the first and second filtering paths to be controlled, such that the output of the system can be a weighted mixture of the outputs of the two paths. Alternatively, the system output could be the output of only one chosen path by setting all gains in the other path to zero. In FIG. 4, the gain controller 470 is implemented in the second path. Alternatively the gain controller may be implemented in the first path.

Therefore the system 400 allows the relative gains of the two paths to be controlled, such that any desired weighting of fast and slow path signals may be achieved when they are mixed together at the system output. The system 400 is versatile as it can be configured to implement feedforward, feedback or hybrid ANC.

The systems of FIGS. 2 and 4 are illustrated with a single pair of feedforward FF and feedback FB microphones. However it will be appreciated that the topology of the systems 200 and 400 may be adapted to include multiple pairs of FF/FB microphones.

The systems 200 and 400 may be implemented as a combination of hardware blocks and a program or algorithm running in an embedded Digital Signal Processor (DSP). In such a system, the DSP would implement the second (slow) filtering path, operating on data which had been down sampled from the microphone sampling frequency. The first (fast) path may be implemented by hardware filtering blocks operating at or close to the microphone sampling frequency in order to minimise system latency. In this case, the combiner could be a dedicated hardware block operated at or close to the microphone sampling frequency. In this example, the DSP output would have to be interpolated to match this rate.

The system of FIG. 4 is particularly well suited for the case where one of the paths is implemented by a DSP. The DSP software can be made to perform both filtering and gain control for both parallel paths with the only additional hardware being the connections from the DSP to places in the second path where those gains are applied.

Allowing the slower path to control the gains applied to the faster path has the advantage that the system can be implemented by a dedicated hardware filter for the fast path and software running on a DSP for the slower path. The fast path can therefore be implemented with less functionality and elements thus increasing power efficiency. The fast path may also be implemented with fade-in, fade-out or gain limiting features without having dedicated hardware blocks for these functions. Instead, the software performing the slower path filtering can implement such functionality for itself, as would normally be required for an ANC system, and for the fast path simultaneously, with some small overhead required only to ensure that the appropriate gains were also sent to the fast path.

For instance a fade gain for implementing a fade in/out function of the anti-noise signal may be set on the slow path and used on the fast path.

ANC systems are tuned by attempting to match external real-world transfer functions with the system filter transfer functions. As a result the fast and slow parallel paths should to be tuned together. Using the system of the disclosure, the fast path could be used to adjust the high frequency content of the signal while the slow path may be used to adjust the low frequency content of the signal. If the high frequency adjustment affects the low frequency content, the low frequency content can still be adjusted by the slow path operating at a lower sampling rate.

Figure 5:
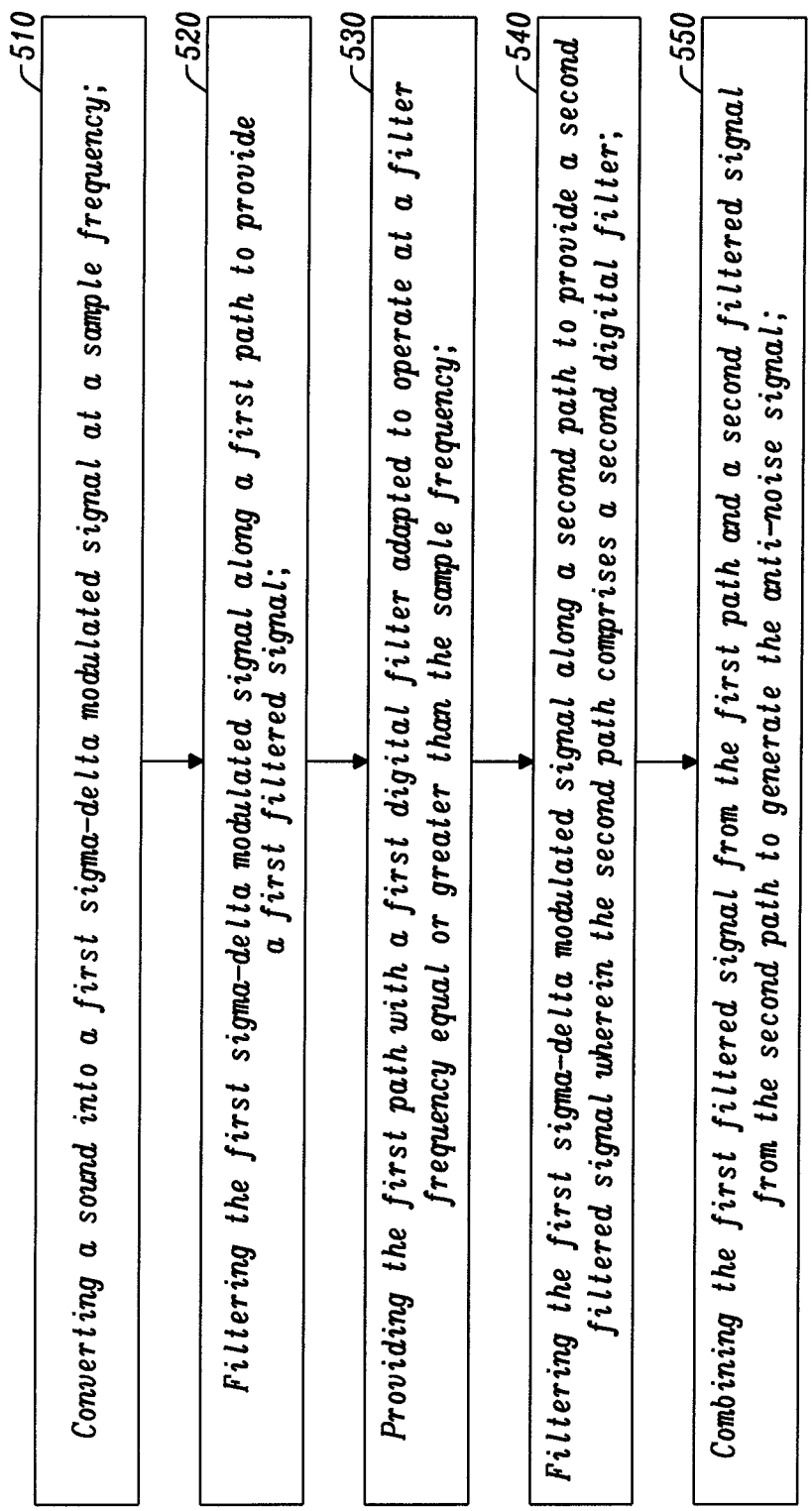
FIG. 5 is a flow diagram of a method for generating an anti-noise signal.

FIG. 5 is a flow diagram of a method for generating an anti-noise signal. At step 510 a sound is converter into a first sigma-delta modulated signal at a sampling frequency. For instance the sound may be environmental sound. At step 520 the first sigma-delta modulated signal is filtered along a first path to provide a first filtered signal. At step 530 a first digital filter is provided on the first path. The first digital filter is adapted to operate at a filter frequency equal or greater than the sampling frequency. At step 540 the first sigma-delta modulated signal is filtered along a second path comprising a second digital filter, to provide a second filtered signal. At step 550 the first filtered signal from the first path and a second filtered signals from the second path are combined to generate the anti-noise signal. Using this approach, the latency of the filter is reduced hence increasing the bandwidth and the noise reduction of the ANC system.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. An anti-noise signal generator comprising
   a first microphone input adapted to receive a first sigma-delta modulated signal at a microphone sampling frequency; and
   a combiner coupled to the first microphone input via a first path and a second path, the combiner being adapted to combine a first filtered signal from the first path and a second filtered signal from the second path to generate the anti-noise signal;
   wherein the first path comprises a first digital filter coupled to the first microphone input; the first digital filter being adapted to—filter the first sigma-delta modulated signal and to operate at a filter frequency equal or greater than the microphone sampling frequency; and
   wherein the second path comprises a second digital filter adapted to filter the first sigma-delta modulated signal.

2. The anti-noise signal generator as claimed in claim 1, wherein the first digital filter is a sigma delta based filter comprising a sigma-delta modulator.

3. The anti-noise signal generator as claimed in claim 1, wherein the first sigma-delta modulated signal is encoded using more than two quantization levels.

4. The anti-noise signal as claimed in claim 3, wherein the second path comprises a decimator and an interpolator, the second digital filter being coupled to the first microphone input via the decimator and to the combiner via the interpolator.

5. The anti-noise signal as claimed in claim 1, comprising a second microphone input adapted to receive a second sigma-delta modulated signal at the microphone sampling frequency from a second microphone, each microphone input being coupled to the combiner via the first path and the second path.

6. The anti-noise signal generator as claimed in claim 5, wherein the second sigma-delta modulated signal is encoded using more than two quantization levels.

7. The anti-noise signal generator as claimed in claim 5 wherein the decimator is adapted to down sample the first and second sigma-delta modulated signals to provide a third signal and a fourth signal; the second digital filter being adapted to filter the third and fourth signals to provide the second filtered signal.

8. The anti-noise signal generator as claimed in claim 7, wherein the interpolator is adapted to interpolate the second filtered signal.

9. The anti-noise signal generator as claimed in claim 5, wherein the first filter is configured to implement a first transfer function to filter the first sigma-delta modulated signal and a second transfer function to filter the second sigma-delta modulated signal.

10. The anti-noise signal generator as claimed in claim 9, wherein the first filter comprises an adder for combining the filtered signals.

11. The anti-noise signal generator as claimed in claim 9, wherein the first filter comprises a first gain associated with the first transfer function and a second gain associated with the second transfer function.

12. The anti-noise signal generator as claimed in claim 11, wherein the second digital filter is configured to implement a third transfer function to filter the first sigma-delta modulated signal and a fourth transfer function to filter the second sigma-delta modulated signal and an adder for combining the filtered signals.

13. The anti-noise signal generator as claimed in claim 12, wherein the second digital filter comprises a third gain associated with the third transfer function and a fourth gain associated with the fourth transfer function.

14. The anti-noise signal generator as claimed in claim 12 comprising a gain controller adapted to adjust at least one of the first, second, third and fourth gains.

15. The anti-noise signal generator as claimed in claim 14, wherein the gain controller is provided on the second path.

16. The anti-noise signal generator as claimed in claim 1, wherein at least one of the first path and the second path is implemented using a digital signal processor configured to execute a filtering algorithm.

17. The anti-noise signal generator as claimed in claim 1, wherein the combiner operates at a frequency equal or greater than the filter frequency of the first filter.

18. The anti-noise signal generator as claimed in claim 1, wherein the first path comprises at least one of an up-sampler and a high pass filter.

19. An audio device comprising
a first microphone adapted to provide a first sigma-delta modulated signal at a microphone sampling frequency;
an anti-noise signal generator for generating an anti-noise signal and
a speaker for converting the anti-noise signal into a wave;
the anti-noise signal generator comprising
a first microphone input adapted to receive the first sigma-delta modulated signal from the first microphone; and
a combiner coupled to the first microphone input via a first path and a second path, the combiner being adapted to combine a first filtered signal from the first path and a second filtered signals from the second path to generate the anti-noise signal;
wherein the first path comprises a first digital filter coupled to the first microphone input; the first digital filter being adapted to filter the first sigma-delta modulated signal and to operate at a filter frequency equal or greater than the microphone sampling frequency and
wherein the second path comprises a second digital filter adapted to filter the first sigma-delta modulated signal.

20. A method of generating an anti-noise signal, the method comprising
converting a sound into a first sigma-delta modulated signal at a sampling frequency;
filtering the first sigma-delta modulated signal along a first path to provide a first filtered signal; wherein the first path comprises a first digital filter adapted to filter the first sigma-delta modulated signal and to operate at a filter frequency equal or greater than the sampling frequency;
filtering the first sigma-delta modulated signal along a second path to provide a second filtered signal; wherein the second path comprises a second digital filter adapted to filter the first sigma-delta modulated signal;
combining the first filtered signal from the first path and a second filtered signals from the second path to generate the anti-noise signal.

21. The method as claimed in claim 20, wherein the first sigma-delta modulated signal is encoded using more than two quantization levels.

22. The method as claimed in claim 20 wherein the first filter comprises a sigma-delta filter.

* * * * *